Oct. 9, 1928.

I. I. NELSON ET AL 1,686,875

SPRING PRESSURE RELIEF VALVE

Filed April 28, 1927

Inventors:
Ira I. Nelson.
Chelwood Smith.
by their attorney,
Charles S. Gooding.

Patented Oct. 9, 1928.

1,686,875

UNITED STATES PATENT OFFICE.

IRA I. NELSON, OF BOSTON, AND CHETWOOD SMITH, OF WORCESTER, MASSACHUSETTS; SAID SMITH ASSIGNOR TO SAID NELSON.

SPRING-PRESSURE RELIEF VALVE.

Application filed April 28, 1927. Serial No. 187,378.

This invention relates to an improved spring pressure relief valve for boilers.

The object of the invention is to provide a relief valve for boilers which will open when the pressure in the boiler exceeds a predetermined amount, and in which the valve will be relieved from pressure when the temperature of the atmosphere exceeds a predetermined amount, and in which the spring which holds the valve closed is externally positioned with relation to the valve casing and valve, and in which the means for adjusting the pressure on the valve is also externally and visibly positioned.

The object of the invention is further to provide an adjustment which, when the spring has been adjusted to a maximum predetermined pressure, will give an audible signal.

To these ends the invention consists in a relief valve such as disclosed in the specification and particularly as pointed out in the claims thereof.

Referring to the drawings.

Like numerals refer to like parts throughout the several views of the drawings.

Figure 1:
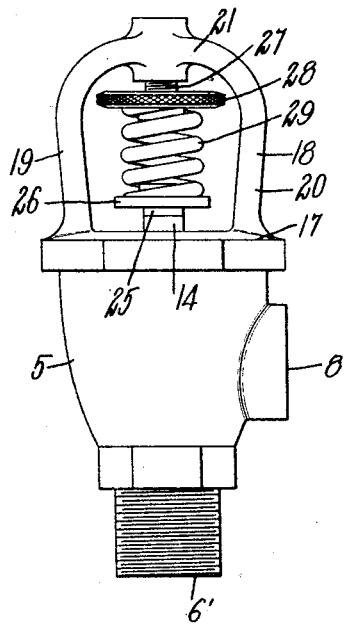
Figure 1 is a front elevation of our improved relief valve.
Figure 3:
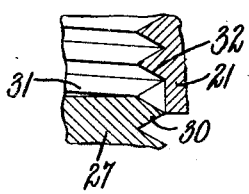
Fig. 3 is an enlarged detail of a portion of the spring adjusting mechanism and audible signal.
Figure 2:
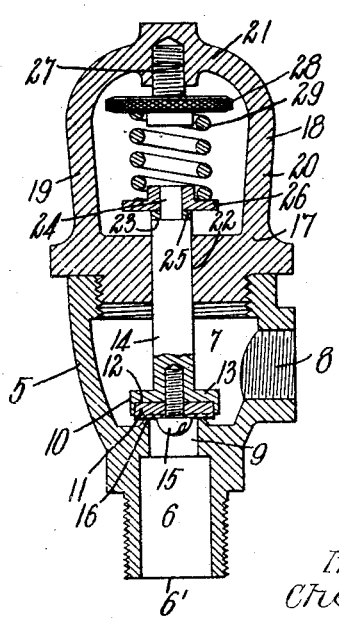
Fig. 2 is a vertical sectional elevation thereof.

In the drawings, 5 is a valve casing provided with an inner chamber 6 having an inlet orifice 6′ and an outer chamber 7, the outer chamber being provided with a fluid discharge outlet 8. A passage 9 connects the inner and outer chambers, and is closed by means of a valve member 10 consisting of a valve disc 11 positioned in a recess 12 provided in a valve holder 13 integral with a valve stem 14. The valve disc 11 is fastened to the holder 13 and valve stem 14 by a screw 15. The valve disc 11, when the valve is closed, rests upon a seat 16 surrounding the upper end of the passage 9.

A top 17, forming in effect a portion of the casing 5, has screw-threaded engagement therewith and is provided with a bracket 18 consisting of two vertical arms 19 and 20 joined together by an arch-shaped cross piece 21. The valve stem 14 is slidably mounted in a bearing 22 projecting through the lower portion of the top 17, and shouldered at its upper end at 23 to provide a stem 24 upon which is mounted a washer 25 and flange collar 26. The flange collar is preferably made of metal, which is fusible when the temperature of the air exceeds a predetermined amount.

An adjusting screw 27 has screw-threaded engagement with the cross piece 21 of the bracket and has an enlarged head 28 knurled on its periphery, which may be easily rotated by hand. A spiral spring 29 is positioned between the head 28 of the screw and a flange of the collar 26. By screwing downwardly upon the adjusting screw 27, the pressure of the spiral spring is increased and the length of the shank portion 27 of the adjusting screw is such that when the screw has been adjusted downwardly, until the pressure of the spring 29 has arrived at a predetermined maximum amount, the uppermost screw thread 30 of the screw 27 will pass out of the lowermost screw thread 31 in the cross piece 21, and when this occurs the screw 27 will be forced upwardly by the spring 29, and the screw thread 30 thereon will then engage the screw thread 32 of the cross piece 21 and will make a noise, whereby an audible signal is given to the operator of the valve, informing him that the spring 29 has been adjusted to the maximum pressure contemplated in the use of the valve.

The reduced portion 24 of the valve stem is rotatable within the collar 26 and within the washer 25, so that the valve stem 14, the holder 13 and the valve disc 11 are rotatable relatively to the seat 16 and the adjusting means, namely, the collar 26, spring 29 and adjusting screw 27.

It will be noted that the movable parts of the valve are all concentric. The advantage secured by the construction of the valve and stem, so that they are rotatable relatively to the seat and the adjusting means is that the valve disc 11 may assume different positions upon the seat while in use, thus adding to the efficiency and long life of the disc 11.

It is evident that without departing from the spirit of the invention that one of the arms 19 or 20 may be omitted and the cross piece 21 of the bracket entirely supported by one arm instead of two.

The collar 26 being constructed of metal, which is fusible at a predetermined temperature of the surrounding air, enables the valve to operate independent of excess pressure in the boiler, in that the collar 26 melting will release the valve member and the stem 14, so that it can be moved upwardly by the pressure of fluid in the inner chamber 6 and allow the fluid to pass into the outer chamber 7 through the discharge outlet 8.

We claim:

1. A pressure relief valve having, in combination, a casing provided with an inner and an outer chamber, with a fluid inlet entering the inner chamber and a fluid discharge outlet from the outer chamber, a movable valve member between said chambers adapted to be operated by excess pressure in said inner chamber to open a passage provided between said chambers, a valve stem on said movable valve member projecting through the top of the casing, a spring outside the casing connected to the valve stem, and means to adjust the pressure of said spring to a predetermined amount, and said means being adapted to give an audible signal when the maximum limit of pressure adjustment is reached.

2. A pressure relief valve having, in combination, a casing provided with an inner and an outer chamber, with a fluid inlet entering the inner chamber and a fluid discharge outlet from the outer chamber, a movable valve member between said chambers adapted to be operated by excess pressure in said inner chamber to open a passage provided between said chambers, a valve stem on said movable valve member, projecting through the top of the casing, an open arch above said top and integral therewith, a spring outside the casing connected to the valve stem and means positioned between the arch and top and projecting only partly through the arch to adjust the pressure of said spring to a predetermined amount, said adjusting means being adapted to give an audible signal when the maximum limit of pressure adjustment is reached.

3. A pressure relief valve having, in combination, a casing provided with an inner and an outer chamber, with a fluid inlet entering the inner chamber and a fluid discharge outlet from the outer chamber, a movable valve member between said chambers adapted to be operated by excess pressure in said inner chamber to open a passage provided between said chambers, a valve stem on said movable valve member projecting through the top of the casing, an arm projecting upwardly from said top, an adjustable screw having screw-threaded engagement with the arm, a metal collar fusible at a predetermined temperature of the atmosphere and mounted on the upper end of the valve stem, and a spiral spring interposed between the screw and collar, whereby the pressure on said valve member may be adjusted to a predetermined amount and the valve member automatically released at a predetermined external temperature and said screw being adapted to give an audible signal when the maximum limit of pressure adjustment is reached.

4. A pressure relief valve having, in combination, a casing provided with an inner and an outer chamber, with a fluid inlet entering the inner chamber and a fluid discharge outlet from the outer chamber, a movable valve member between said chambers adapted to be operated by excess pressure in said inner chamber to open a passage provided between said chambers, a valve stem on said movable valve member projecting through the top of the casing, an arm projecting upwardly from said top, an adjustable screw having screw-threaded engagement with the arm, a collar rotatably mounted on the upper end of the valve stem, and a spiral spring interposed between the adjusting screw and collar, whereby the pressure on said valve member may be adjusted, the length of said screw being such that it will pass out of screw-threaded engagement with the arm when the spring has been compressed by it a predetermined amount, said screw being adapted to give an audible signal when the maximum limit of pressure adjustment is reached.

In testimony whereof we have hereunto set our hands.

IRA I. NELSON.
CHETWOOD SMITH.